US007271987B1

(12) United States Patent
Zhang et al.

(10) Patent No.: US 7,271,987 B1
(45) Date of Patent: Sep. 18, 2007

(54) GROUNDING FAULT CIRCUIT INTERRUPTER

(75) Inventors: Kuiyang Zhang, Wuijiang (CN); Songling Lin, Wuijiang (CN)

(73) Assignee: Suzhou Songbao Electric Co., Ltd., Wuijiang Jiangsu Province (CN)

( * ) Notice: Subject to any disclaimer, the term of this patent is extended or adjusted under 35 U.S.C. 154(b) by 0 days.

(21) Appl. No.: 11/395,336

(22) Filed: Apr. 3, 2006

(51) Int. Cl.
*H01H 73/00* (2006.01)
*H02H 9/08* (2006.01)

(52) U.S. Cl. ............................ 361/42; 335/18; 335/26

(58) Field of Classification Search .................... 335/6, 335/18, 21, 25, 26; 361/42–50
See application file for complete search history.

(56) References Cited

U.S. PATENT DOCUMENTS 6,954,125 B2 * 10/2005 Wu et al. ..................... 335/18
2006/0244556 A1 * 11/2006 Chen .......................... 335/172
2007/0018763 A1 * 1/2007 Wang ......................... 335/172
2007/0030608 A1 * 2/2007 Baldwin et al. .............. 361/42

* cited by examiner

*Primary Examiner*—Ramon M. Barrera
(74) *Attorney, Agent, or Firm*—Venable LLP; Robert Kinberg

(57) ABSTRACT

A grounding fault circuit interrupter (GFCI), including a housing, a trip means, a pair of static contact pieces fixed on the housing, a pair of load contact pieces fixed on the housing, a pair of slide frames, a pair of movable contact pieces fixed on the slide frames respectively, which is resiliently movable, said trip means including a trip coil, a plunger provided in the trip coil, a trip spring abutted against the plunger, a balance frame, a latch, a reset pull rod, wherein said plunger is provided with an annular groove, the plunger movably connected to the latch through the annular groove, wherein the latch has an arc-shaped opening thereon and is movably provided on the balance frame, said balance frame having two wedge sides, the wedge sides in contact with the slide frames; wherein when the reset pull rod is connected with the latch, the static contact pieces are in contact with the movable contact pieces. The grounding fault circuit interrupter has a reverse wiring protection function, the receptacle inlet openings in the face portion of which will not be energized when it's reverse wired.

6 Claims, 9 Drawing Sheets

GROUNDING FAULT CIRCUIT INTERRUPTER

FIELD OF THE INVENTION

This invention relates to a grounding fault protection device, especially a grounding fault circuit interrupter receptacle with reverse wiring protection, the receptacle inlet openings in the face portion of which are not energized when it's reverse wired.

BACKGROUND OF THE INVENTION

Grounding fault circuit interrupter (GFCI) is widely used with its effective application in preventing electric shock and fire caused by grounding fault. A load can be connected to the grounding fault circuit interrupter through receptacle inlet openings in the face portion, and it also can be connected through load binding screws. Therefore, users may miswire the line side wiring to the load side when in installation or in use. In this case, if a grounding fault circuit interrupter does not have the function of reverse wiring protection, it is just like a common receptacle without earth leakage protection, which may affect the safety of users. Traditional GFCIs usually have certain limitations in configuration, which may affect the performance of product or increase the cost of product. For example, in the Chinese utility model with patent number ZL.03243045., the GFCI adopts an electromagnetic tripper, however it is complex in configuration and high in cost. Moreover, it utilizes permanent magnets in tripper so it may be greatly affected in the aspect of anti-interference. And in the U.S. Pat. No. 6,813,126, although the GFCI has a relatively simple configuration, however the latching fingers on the both sides of the reset switch have quite a high requirement for manufacturing, and they may fail to engage and even fail to reset if there's a little deviation in their positions. Or they may disengage when vibration exists. In addition, when the receptacle inlet openings of the face portion are not energized, it is hard for the two movable contact points on the movable contact pieces which has one end fixed and the other end resiliently movable to contact the static contact points on the static contact pieces at the same time, thus may result in strong electric arc during the instances of on/off, shortening the life-span of the product or it may result in loose contact after reset, affecting the performance of the product, or even causing danger.

BRIEF SUMMERY OF THE INVENTION

The object of the invention is to provide a grounding fault circuit interrupter with reverse wiring protection, the receptacle inlet openings in the face portion of which will not be energized when it's reverse wired.

In one technical solution of the present invention, it is provided with a grounding fault circuit interrupter, including a housing, a trip means, and a control circuit, and it further comprises a pair of static contact pieces fixed on the housing; a pair of load contact pieces fixed on the housing; a pair of slide frames; a pair of movable contact pieces fixed on the slide frames respectively, which are resiliently movable and each has one end connected to conductive pieces through conductive strips, the conductive pieces welded on the circuit board respectively and passing through a sensing transformer and a neutral transformer. The pair of slide frames is resiliently and movably provided on a coil bracket. When the static contact pieces are in contact the movable contact pieces, the static contact pieces are electrically connected to the load contact pieces; and when the static contact pieces are separated from the movable contact pieces, the static contact pieces are electrically disconnected from the load contact pieces.

In another technical solution of the present invention, it is provided with a grounding fault circuit interrupter, including a housing, a trip means, a pair of static contact pieces fixed on the housing, a pair of load contact pieces fixed on the housing, and the grounding fault circuit interrupter further comprises a pair of slide frames; a pair of movable contact pieces fixed on the slide frames respectively, which is resiliently movable. The trip means including a trip coil, a plunger provided in the trip coil, a trip spring abutted against the plunger, a balance frame, a latch, a reset pull rod. The plunger is provided with an annular groove, through which the plunger is movably connected to the latch. The latch has an arc-shaped opening and is movably provided on the balance frame. The balance frame has two wedge sides, the wedge sides in contact with the slide frames. When the reset pull rod is connected with the latch, the static contact pieces are in contact with the movable contact pieces; and when the reset pull rod is separated from the latch, the static contact pieces are withdrawn contact with the movable contact pieces.

The grounding fault circuit interrupter according to the invention has a reverse wiring protection and receptacle inlet openings of a face portion will not be energized when the grounding fault circuit interrupter is reverse wired. And also it is sensitive, convenient to assemble, low in cost and high in anti-interference ability.

The bottom side of the reset pull rod is configured to be flat and bigger than the arc-shaped opening in the latch of the trip means; when the grounding fault circuit interrupter is power off, the reset pull rod cannot go through the latch so as to reset the interrupter; the invention further utilizes a reset control circuit, when the grounding fault circuit interrupter is power on, press the reset switch so that when the bottom side of the reset pull rod connected to the reset switch is about to reach the latch, a spring provided at one side of the reset switch switches on the reset control circuit, produces a man-made trigger signal and gate a silicon controlled rectifier (SCR) into conduction to energize the trip coil. The trip coil is then energized and produces an electromagnetic force that acts on the plunger, making the plunger overcome the elasticity of spring and move together with the latch connected on it, which further enables the bottom side of the reset pull rod to go through the latch. Therefore when the arc-shaped opening on the latch is lodged in the lock groove of reset pull rod, the reset pull rod will move together with the latch under the resilience of the reset spring. And the latch further makes the balance frame to move together with it in the same direction, so the wedge sides of the balance frame will push the slide frames, the slide frames being arranged on both sides of the balance frame and provided with movable contact pieces, make them overcome the elasticity of the spring and move toward a direction that makes them get closer, realizing the reset of the GFCI.

When the static contact pieces are separated from the load contact pieces, they switches on the circuit through their own contact points, thus the receptacle inlet openings in the face portion will not be energized when it's reverse wired.

When the grounding fault circuit interrupter according to the invention is power on, if its load side has earth leakage fault or a wrong man-made test current is added, the control circuit will trigger and gate the controlled silicon rectifier (SCR) into conduction, so that the trip coil connected to the SCR at one end will be switched on and apply an electromagnetic force on the plunger, thereby interrupt the circuit promptly.

BRIEF DESCRIPTION OF THE DRAWINGS

The present invention will be further described below in conjunction with the drawings and the embodiments.

DESCRIPTION OF THE PREFERRED EMBODIMENTS

Figure 1:
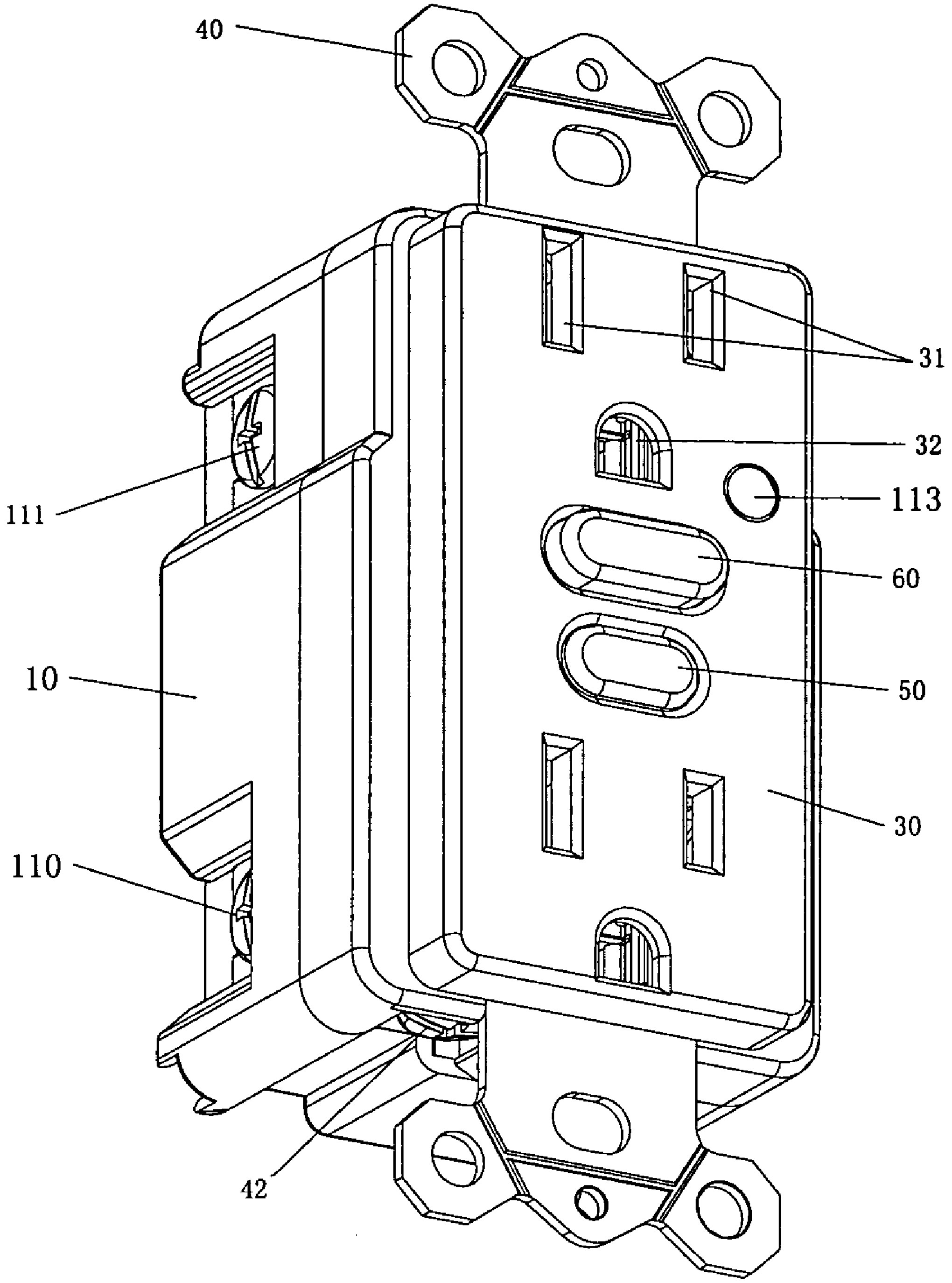
FIG. 1 is a prospective view of a GFCI according to an embodiment of the present invention.

Referring to the drawings, a grounding fault circuit interrupter, including a housing (consisting of a face portion 30, a middle body 20 and a base 10), a trip means, and a control circuit. It further comprises a pair of static contact pieces 15, 16 fixed on the base 10; a pair of load contact pieces 17, 18 fixed on the base 10; a pair of slide frames 13, 14; a pair of movable contact pieces 22, 23 fixed on the slide frames 13, 14 respectively, which are resiliently movable and each has one end connected to conductive pieces 26, 27 through conductive strips 24, 25. The conductive pieces 26, 27 are welded on the circuit board 90 respectively and going through a sensing transformer 83 and a neutral transformer 81. The pair of slide frames 13, 14 are resiliently and movably provided on a coil bracket 71. When the static contact pieces 15, 16 contact the movable contact pieces 22, 23, the static contact pieces 15, 16 are electrically connected to the load contact pieces 17, 18, and when the static contact pieces 15, 16 are separated from the movable contact pieces 22, 23, the static contact pieces 15, 16 are electrically disconnected from the load contact pieces 17, 18.

The trip means comprises a trip coil 72, a plunger 74 provided in the trip coil 72, a trip spring 73 abutted against the plunger 74, a balance frame 76, a latch 75, a reset pull rod 61 slidably provided in the balance frame 76, the plunger 74 having an annular groove 35 through which the plunger 74 is slidably connected to the latch 75, the latch 75 having an arc-shaped opening 12 and slidably provided on the balance frame 76, the balance frame 76 having two wedge sides 28, 29, the wedge sides 28, 29 in contact with the slide frames 13, 14. When the reset pull rod 61 is connected with the latch 75, the static contact pieces 15, 16 are in contact with the movable contact pieces 22, 23. When the reset pull rod 61 is separated from the latch 75, the static contact pieces 15, 16 are withdrawn contact with the movable contact pieces 22, 23. The reset pull rod 61 has a lock groove 11, and when the reset pull rod 61 connects with the latch 75, the latch 75 is lodged in the lock groove 11.

FIG. 1 shows a view of the exterior of a GFCI according to an embodiment of the present invention, wherein 40 represents a mounting piece, 31 represents load entry ports, 32 represents ground-prong-receiving openings, 60 represents a reset switch, 50 represents a test switch, 30 represents a face portion, 42 represents grounding screw, 110 represents line binding screw, 111 represents load binding screw, and 113 represents indicator cover. A load can be connected to the grounding fault circuit interrupter through receptacle inlet openings in the face portion, and it also can be connected through load binding screws.

The GFCI illustrated in FIG. 1 may be rated, for example, at 15A. The present invention also provides other types of GFCI, at various amperage ratings, and these GFCI receptacles all have two configurations, one without an indicator and the other with an indicator. Both configurations operate under the same principle. Therefore, the description below, while specifically for the rated 15A GFCI with an indicator, the description also applies to the other types of GFCIs.

Figure 2:
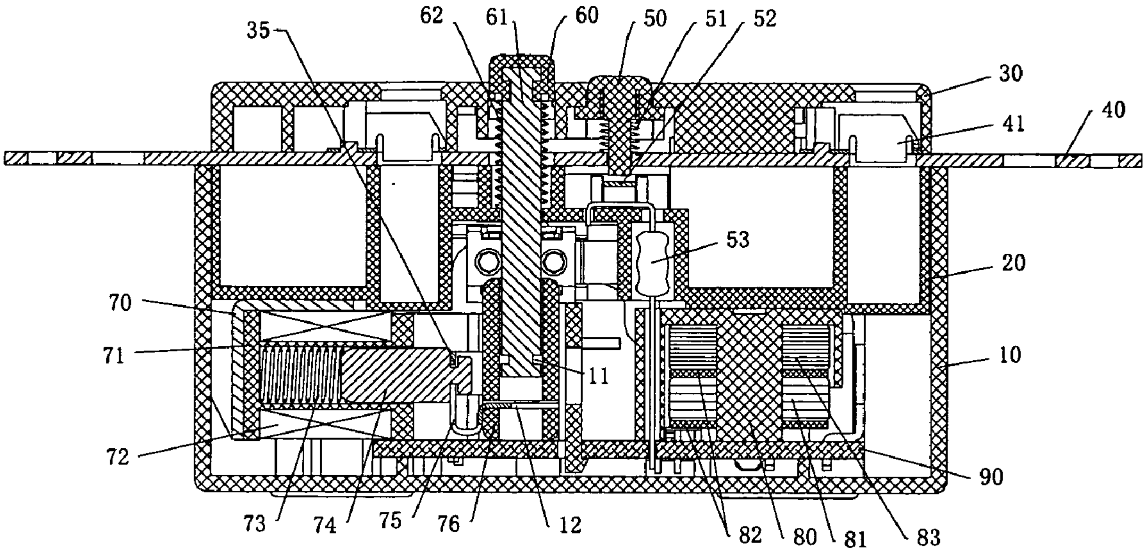
FIG. 2 is a cross-sectional view, in longitudinal section, of the GFCI in FIG. 1 showing the relative positions of the assembly in the tripped condition.
Figure 3:
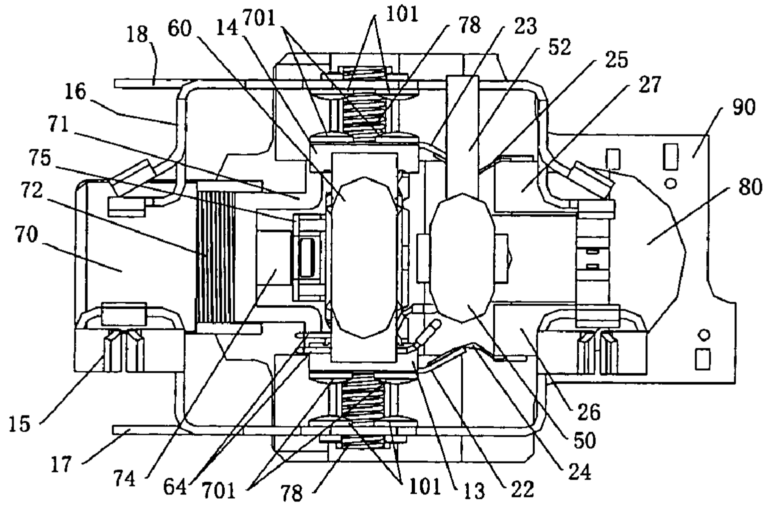
FIG. 3 is a partly top plan view of the GFCI in FIG. 1 with the face portion removed.

Referring to FIG. 2 and FIG. 3, the assembled relation of the GFCI receptacle is shown in the trip condition. All of the subassemblies and component parts are fixed mainly to the housing (consisting of the face portion 30, the middle body 20 and the base 10) of the GFCI. A trip means is provided in the GFCI according to the present invention. The trip means includes a shield cover 70, one end of which is abutted against one raised side of the base 10 and the other end of which is abutted against an end portion of the coil bracket 71, the coil bracket 71 being mounted on a circuit board 90 by two binding pins; a trip spring 73, one end of which is abutted against an end portion of the coil bracket 71, and the other end of which is abutted against one end of the plunger 74, the other end of the plunger 74 being slidably connected to the latch 75 through an annular groove 35 set on the plunger 74; and an arc-shaped opening, which is provided on the other end of the latch 75 and slidably arranged in a corresponding groove of the balance frame 76; wherein the bottom side of the reset pull rod 61 is configured to be flat and bigger than the arc-shaped opening 12 in the latch 75; when the GFCI is power off, the reset pull rod 61 cannot go through the arc-shaped opening 12 in the latch 75, which functions as reverse wiring protection; and when the GFCI is power on, press the reset switch so as to produce a man-made trigger signal which energizes the trip coil 72 and produces an instant force acting on the plunger 74, making the plunger 74 overcome the resilience of the trip spring 73 and move in a direction departing the balance frame 76. Thus the bottom side of the reset pull rod 61 is able to pass through the arc-shaped opening 12 of the latch 75 and lodge the arc-shaped opening 12 in the lock groove 11 of reset pull rod 61. And the resilience of the reset spring 62 makes the latch 75 to move together with the balance frame 76, thereby reset the GFCI. In this case, if a test switch 50 is pressed, a test piece 52 will overcome the resilience of test spring 51 and get in contact with the test resistor 53 so as to switch on the test circuit. Thus a man-made fault current added to the GFCI realizes the tripping of the trip means. Then the test piece 52 will prop up the test switch 50 with its resilience, making the top surface of the test switch 50 substantially level with the surface of the face portion 30. A sensing bracket 80 is fixed on the circuit board 90 through four binding pins. A sensing transformer 83 and a neutral transformer 81 are mounted on the sensing bracket 80 and between the sensing transformer 83 and the neutral transformer 81 there is an isolation layer 82. The sensing transformer 83 may be composed, for example, of high original magneto-conductivity magnetic alloy flakes and enamel-insulated wire. The neutral transformer 81 may, for example, be composed of ferrite (high μ value, large temperature modulus) and enamel-insulated wire. In order to realize that the receptacle inlet openings in the face portion 30 are not energized when it's reverse wired, the static contact pieces 15, 16 are withdrawn contact with the load contact pieces 17, 18, respectively, thus they are not electrically connected with each other and they are only able to switch on the circuit by a contact between static contact points 101 thereon and movable contact points 701 on the movable contact pieces 22, 23. The electricity from the power supply reaches the conductive strips 24, 25 through conductive pieces 26, 27 and further reaches movable contact pieces 22, 23. Respective one ends of each conductive piece 26, 27 pass through the sensing bracket 80, the sensing transformer 83, the isolation layer 82 and the neutral transformer 81 and are welded on the circuit board 90, respectively. The other ends of each conductive pieces 26, 27 are welded on the conductive pieces 26, 27 respectively. Movable contact pieces 22, 23 are arranged on the slide frames 13, 14 respectively. A pair of springs 78 is arranged on the coil bracket 71, each with one end abutted against the slide frames 13, 14. The slide frames 13, 14 together with the movable contact pieces 22, 23 with movable contact points 701 attached thereon are kept in a trip position under the resilience of the springs 78.

Figure 4:
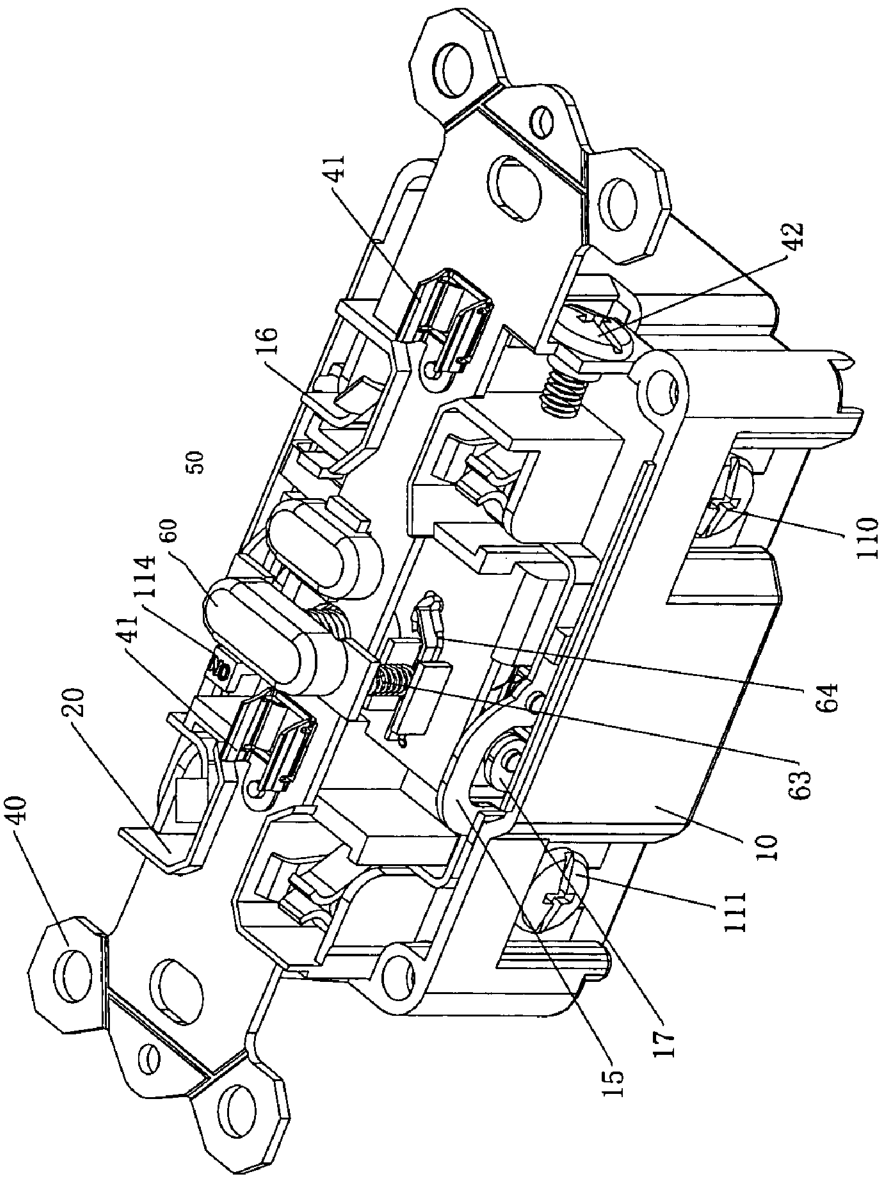
FIG. 4 is a perspective view of the GFCI in FIG. 1 with the face portion removed, showing the internal configuration thereof.
Figure 5:
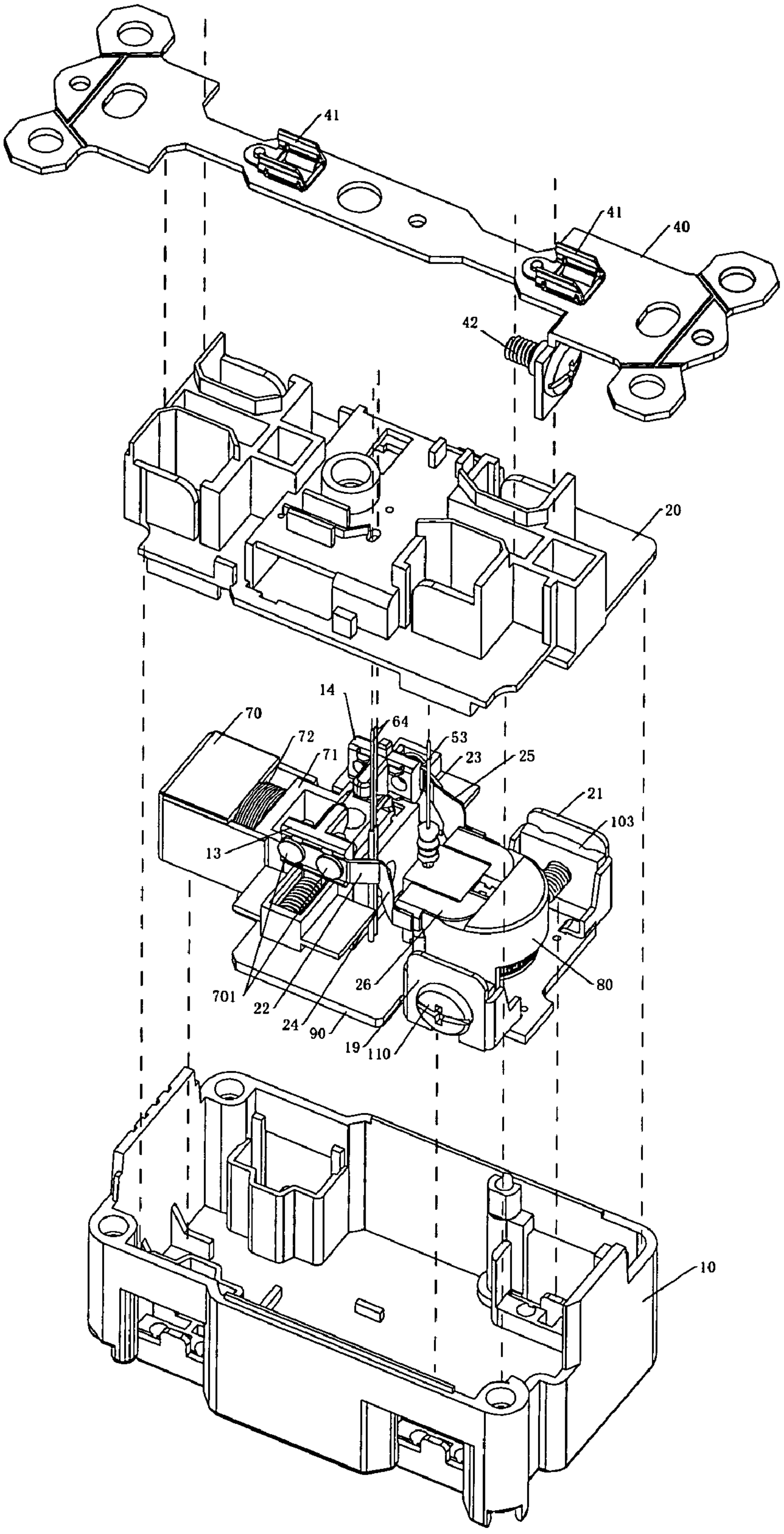
FIG. 5 is a partly exploded, perspective view of the GFCI in FIG. 1.

Referring to FIG. 4 and FIG. 5, a pair of static contact pieces 15, 16 with static contact points 101 thereon are fixed on the middle body 20. The mounting piece 40, which has a grounding wire holder 41 and a threaded opening to receive a grounding screw 42 for connection to an external ground wire, is impacted by the face portion 30. A resilient member is mounted below the reset switch 60 for supporting the reset switch 60, which can be a pair of resilient metal pieces or a spring. In this embodiment, the resilient member is a reset spring 62 as showed in the figures. In the situation that the reset spring 62 resiliently contacts with a pair of lead wires 64 of the reset control circuit, the reset control circuit is switched on such that a man-made instant current is added to the trip coil thereby reset the GFCI.

Figure 6:
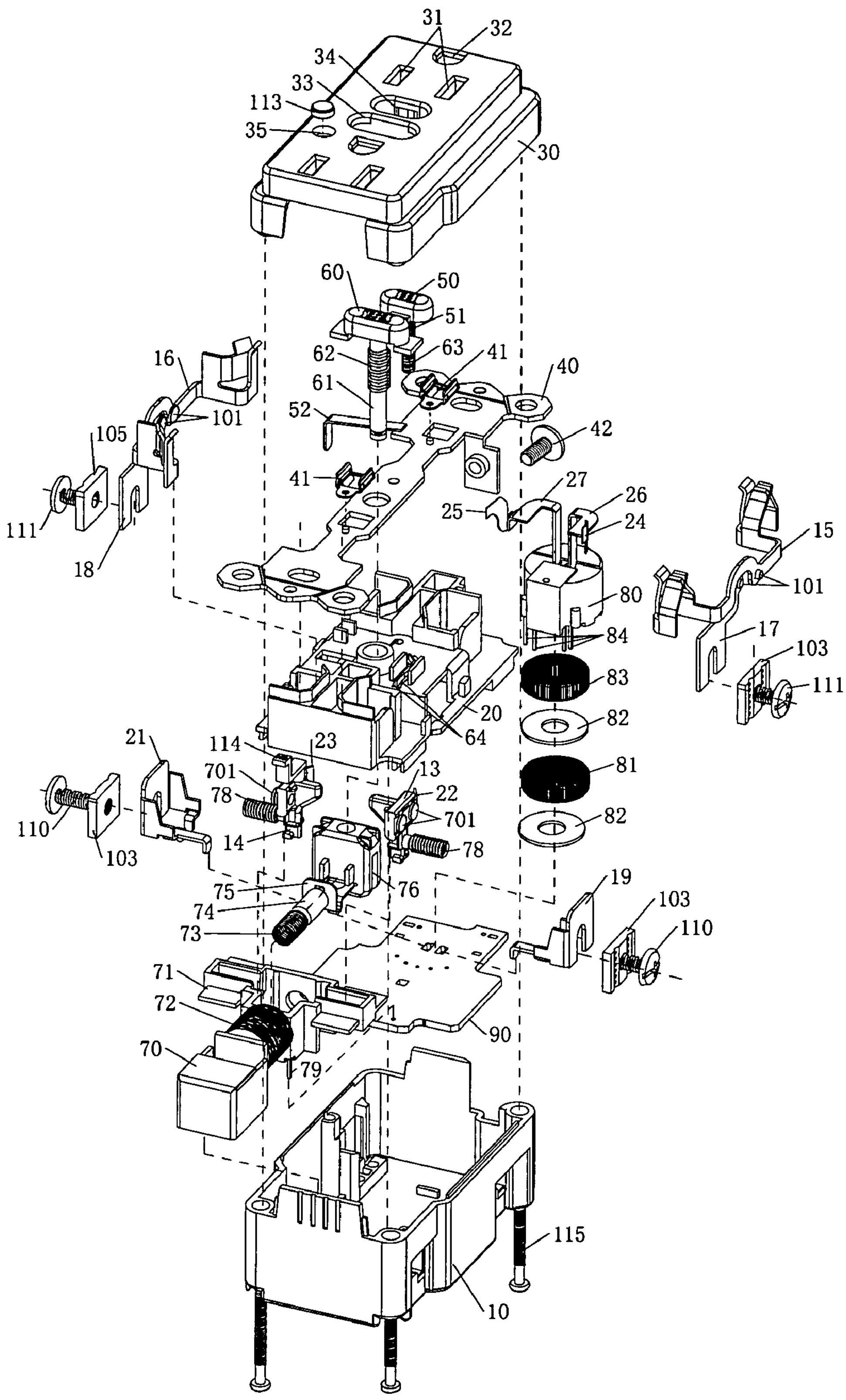
FIG. 6 is an exploded, perspective view of the GFCI in FIG. 1.

FIG. 6 is an exploded, perspective view of the GFCI. From this figure we can see that the GFCI according to the invention mainly comprises a base 10, a middle body 20, a face portion 30, a mounting piece 40 with grounding wire holders 41 and a grounding screw 42, a pair of movable contact pieces 22, 23 with movable contact points 701, a pair of static contact pieces 15, 16 with static contact points 101, a trip means, a test means and a control circuit. 19, 21 are source ends. 103 is a wire-binding board. 110 is a line binding screw. 111 is a load screw. 90 is a circuit board. All the subassemblies and components are assembled as showed in the figure and are impacted by four screws 115. A reset switch opening 33 in the face portion and the reset switch 60 are matched with each other so that the reset switch 60 is circumferentially positioned. And also, a test switch opening 34 and a test switch 50 are matched with each other so that the test switch 50 is positioned too. An indicating rod 114 coated with definite sign is arranged on the slide frame 14 for indicating reset. When the GFCI resets, the indicating rod 114 is kept in a reset position by the slide frame 14, thereby indicates reset.

Figure 7:
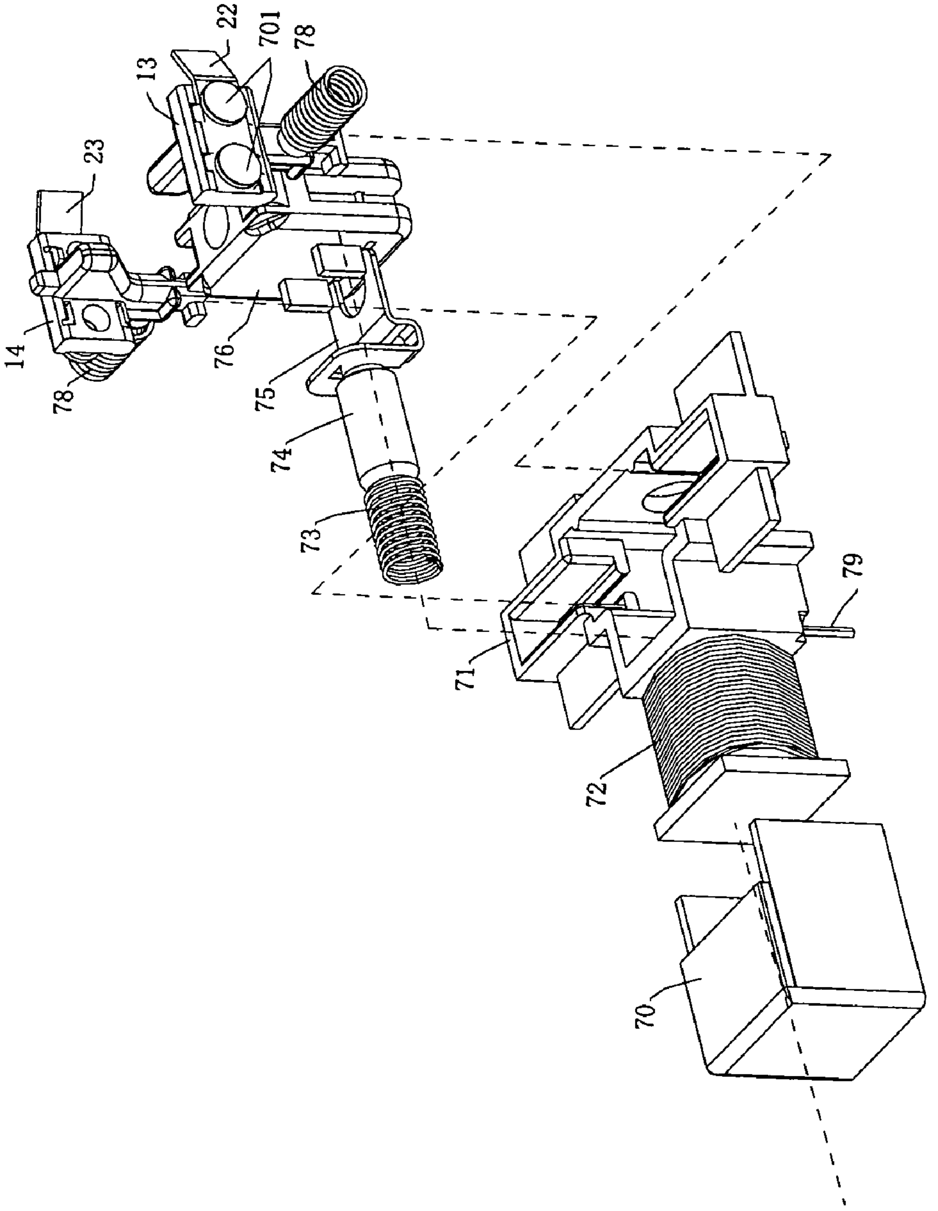
FIG. 7 is an exploded view of the electromagnetic tripper of the GFCI in FIG. 1.

FIG. 7 is an exploded view of the trip means of the GFCI. The trip means includes: a shield cover 70, a coil bracket 71, a trip coil 72, a trip spring 73, a plunger 74, a latch 75, a balance frame 76, a pair of slide frames 13, 14, a spring 78, a pin 79, a pair of movable contact pieces 22, 23 provided on the slide frames, a pair of movable contact points 701 riveted on the movable contact pieces. The movable contact points 701 are kept in a trip status by the resilience of the spring 78. A shield cover 70 is used to enhance the anti-interference of the product. The assembled position relation of the electromagnetic tripper is further shown in FIG. 7.

Figure 8:
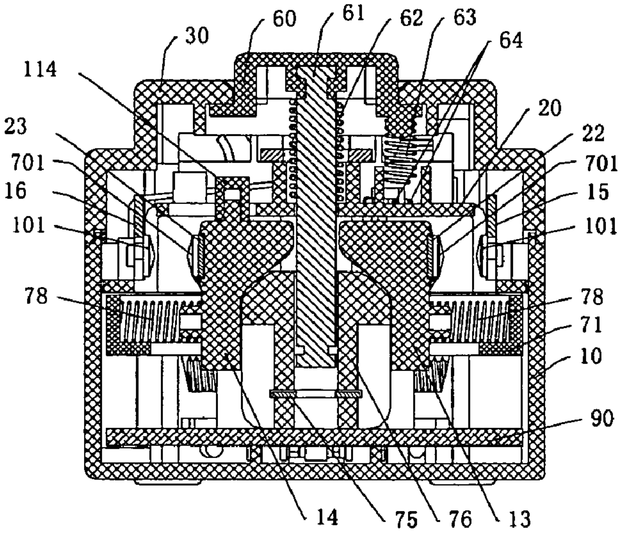
FIG. 8 is a cross-sectional view of the GFCI in FIG. 1 in the tripped status.
Figure 9:
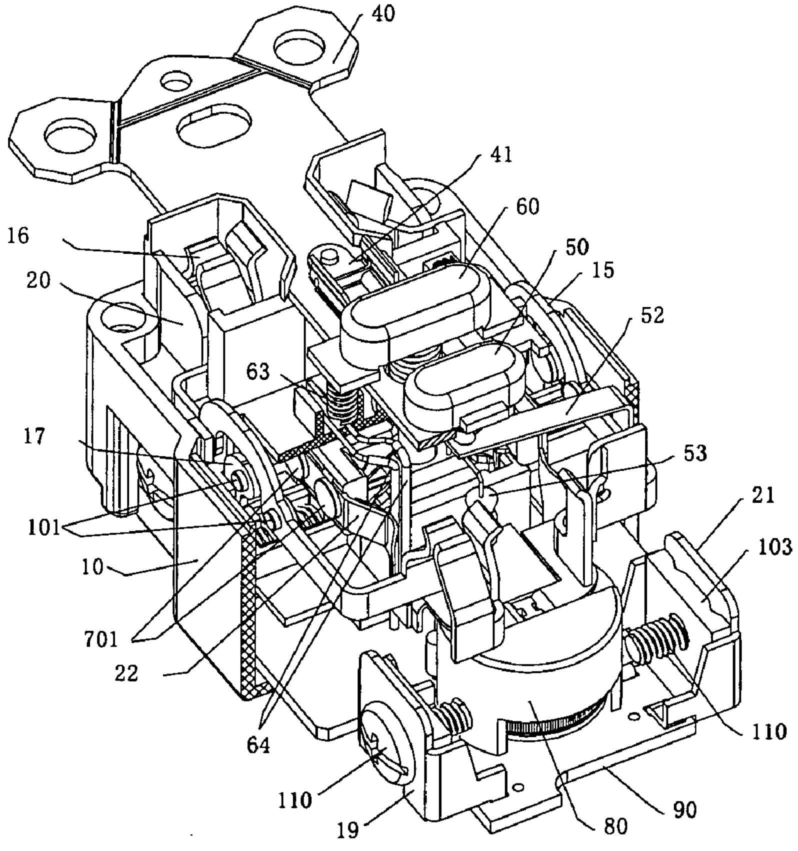
FIG. 9 is a partly prospective view of the GFCI in FIG. 1 in the tripped status.
Figure 10:
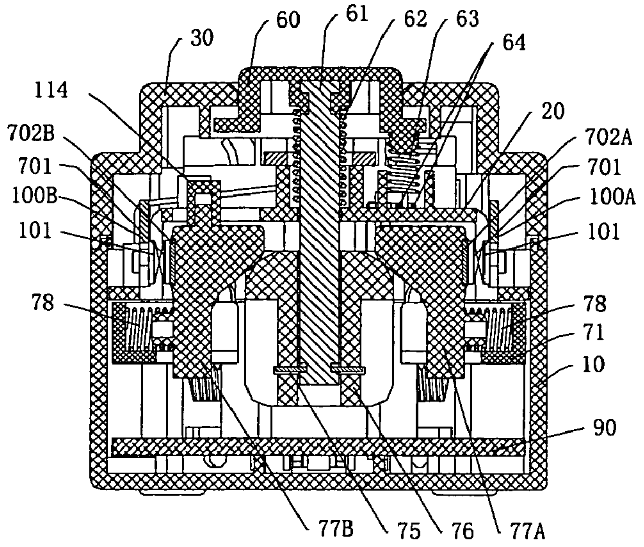
FIG. 10 is a cross-sectional view of the GFCI in FIG. 1 in the closed status.
Figure 11:
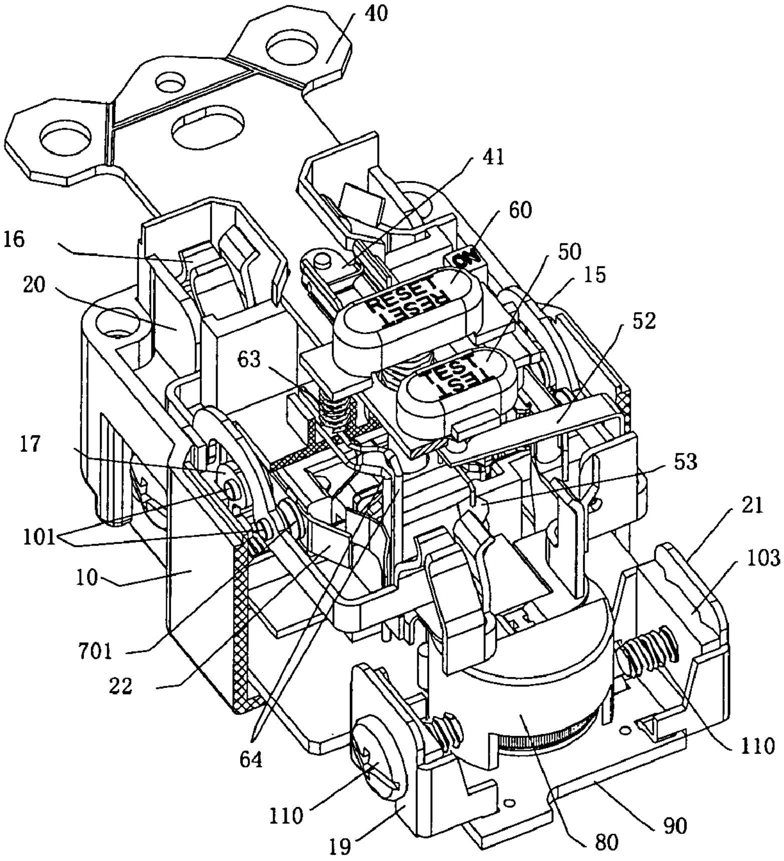
FIG. 11 is a partly prospective view of the GFCI in FIG. 1 in the closed status.

FIG. 8 is a cross-sectional view of the GFCI in the tripped status, and FIG. 10 is a cross-sectional view of the GFCI in the closed status. FIG. 9 is a partly prospective view of the GFCI in the tripped status, and FIG. 11 is a partly prospective view of the GFCI in the closed status. When the trip coil 72 is energized, it produces an electromagnetic force, which acts on the plunger 74 and drives the plunger 74 back and forth together with the latch 75 connected on it. When the reset switch 60 is pressed and the reset pull rod 61 is about to reach the latch 75, a small spring 63 will be electrically connected to the two lead wires 64 which control the on/off of reset control circuit, switch on the reset control circuit and further add a man-made instant current to the trip coil 72. The trip coil 72 then produces an instant electromagnetic force which acts on the plunger 74, causing the plunger 74 to bring away the latch 75 so that a bottom side of the reset pull rod 61 is able to pass through the latch 75. Under the resilience of the trip spring 73, an arc-shaped opening in the latch 75 will be lodged tightly in the lock groove 11 of the reset pull rod 61 and the resilience of the reset spring 62 will further drive the latch 75 to move upward together with the balance frame 76. As the balance frame 76 moves upward, the two wedge sides of the balance frame will push the slide frames to move toward a direction that makes them more and more apart from each other until the movable contact point 701 contact with the static contact points 101, thereby the GFCI is closed. On the other hand, an end of the test piece 52 is fixed in the corresponding groove of the middle body 20, and an inner side of it is abutted against an outer side of the static contact pieces 15,16. The other end of the test piece 52 is able to resiliently contact the test resistor 53. When a test switch 50 is pressed and the test piece 52 contacts with the test resistor 53, if a man-made fault current is added on the GFCI according to the invention, or else if a grounding fault exists in the load side and the fault current reaches a threshold value, the control circuit will energize the trip coil 72 instantly and produces an electromagnetic force which acts on the plunger 74. As a result, the plunger 74 will promptly drive the latch 75 to move, dislodge the arc-shaped opening 12 on the latch 75 from the lock groove 11 in the resent pull rod 61, and push the movable contact points 701 away from the static contact points 101 under the help of a pair of springs 78, thereby trip the GFCI.

Figure 12:
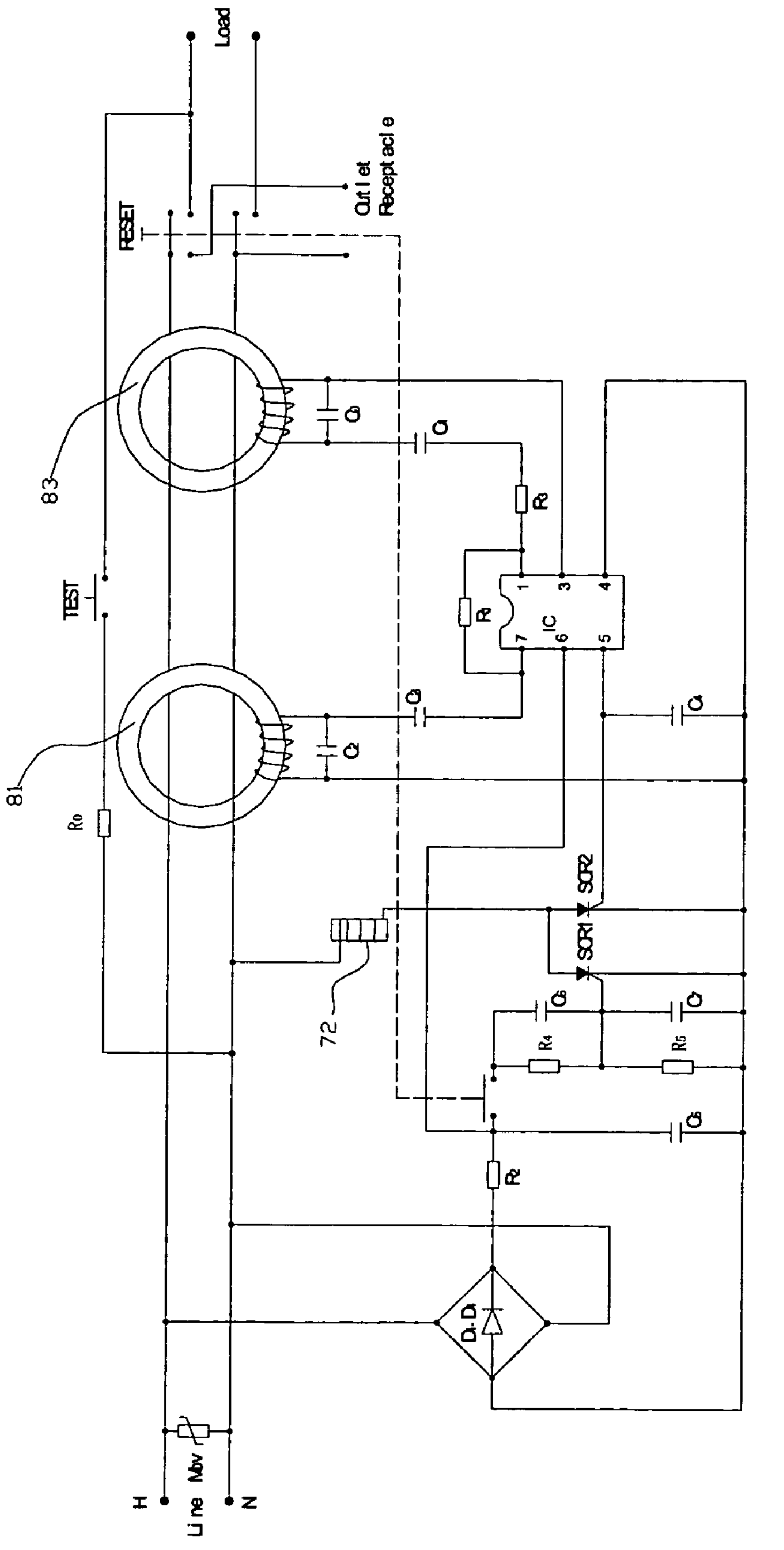
FIG. 12 is a schematic diagram of a circuit of the GFCI according to an embodiment of the present invention.

FIG. 12 shows a general GFCI circuit of the present invention. Diodes D1-D4 form a rectifying circuit, converting the AC input to a DC output. A DC output terminal of the rectifying circuit is connected to a resistor R2. The other end of R2 connects with a capacitor C5. The other end of C5 is then connected to the "ground". In the exemplary 20A-rated GFCI device, an electrical voltage of approximately 26V formed between the two ends of C5 serves as a DC voltage for the circuit.

The reset switch RESET, the breaking switch K, the resistors R4 and R5, the capacitors C6 and C7, the SCR1, the trip coil 72 etc. form the reset control circuit. One end of the breaking switch K is connected to R2, and the other end of the breaking switch K is connected to R4 and C6. The other end of R4 and C6 is connected with the gate pole of SCR1, R5 and C7. Capacitor C7 is connected between the gate and cathode of the SCR1 to serve as a filter for preventing noise pulses. One end of the trip coil 72 is connected to the positive pole of SCR1, and the other end of the trip coil 72 is connected to the source end of the GFCI. One end of the reset switch RESET is connected to the line terminal; the other end of RESET is connected to the load terminal. It is noted that the contact point between the reset switch RESET and the line terminal corresponds to the movable contact points 701 of the movable contact pieces, and the contact point between the reset switch RESET and the load terminal corresponds to the static contact points 101 of the static contact pieces. The power supply of the control circuit is connected to the line of the GFCI, so when the GFCI is energized, the control circuit of the GFCI is also energized. When the breaking switch K is pressed, the capacitor C6 is charged up, generating a trigger signal to gate the SCR1 into conduction. Consequently the trip coil 72 is energized factitiously. That is, the trip coil 72 produces an electromagnetic force to act on the plunger 74, causing the reset switch RESET to close thereby reset the GFCI.

The IC may be a special integrated circuit for GFCI, for example, of type RV4145A.

The two ends of a sensing coil of sensing transformer 83 connect to opposite ends of the capacitor C0. One end of the sensing coil of sensing transformer 83 serially connects to the capacitor C1, the resistor R3, and then the terminal 1 of the IC (which, as discussed below, may include an amplifier circuit), and the other end of the sensing coil of 83 connects to the terminal 3 of the IC, forming a transformer-coupled circuit that receives differential voltage inputs. The feedback resistor, R1, connects to the terminal 1 of the IC at one end and to the terminal 7 of the IC at the other end. The magnitude of resistance at R1 determines the amplification of the IC, that is, the threshold value for the tripping action of the GFCI.

The neutral transformer 81, the capacitor C2, and the capacitor C3 form the neutral ground-fault protection circuit. The two ends of the sensing coil of neutral transformer 81 are connected to opposite ends of the capacitor C2. One end of the sensing coil of neutral transformer 81 is further connected to the capacitor C3 and the other end of the sensing coil of neutral transformer 81 is connected to the "ground". The other end of the capacitor C3 is connected to the terminal 7 of the IC.

Given the above-described apparatus, neutral ground-fault protection occurs as follows. The transformers 83 and 81 form a sine wave oscillator with a corresponding transformer-coupled oscillating frequency. When neutral ground fault occurs, this oscillator starts to oscillate. When the magnitude of the oscillation reaches the IC threshold value, then the terminal 5 of the IC delivers a trigger signal, putting the tripper in motion and the GFCI breaks.

The trip coil 72, the SCR2 and the capacitor C4 form a trip control circuit. One end of the trip coil 72 is connected to the line terminal of the GFCI, and the other end of the trip coil 72 is connected to the positive pole of SCR2. The gate pole of SCR2 is connected to the terminal 5 of the IC and the cathode of the SCR2 is connected to the "ground". The gate pole and the cathode pole of the SCR2 are connected with opposite ends of the capacitor C4.

In operation, the sensing transformer 83 serves as a differential transformer for detecting a current leakage between the line side of the load terminal and an earth ground, while the neutral transformer (N2) detects current leakage between the neutral side of the load terminal and an earth ground. In the absence of a ground fault condition, the currents flowing through the conductors will be equal and opposite, and no net flux will be generated in the core of the sensing transformer 83. In the event that a connection occurs between the line side of the load side and ground, however, the current flowing through the conductors will no longer precisely cancel and a net flux will be generated in the core of the sensing transformer 83. When the flux increases beyond a predetermined value, it will give rise to a potential at the output of the sensing transformer 83, which is applied to the inputs 1 and 3 of the IC and trip circuit, and further amplified by the IC to be sufficient to produce a trip signal on the output terminal 5. The trip signal then gates the SCR2 into conduction, energizes the trip coil 72 and puts the tripper in motion thereby breaks the GFCI.

The test switch TEST and the current limiting resistor R0 form the test circuit. The current limiting resistor R0 is connected to the power source, and the other end of resistor R0 is connected to the test switch TEST. The other end of the test switch TEST is connected to the other end of the load. The test circuit constantly provides the GFCI a 8 mA fault current for periodically checking of the working status of the GFCI.

The circuit shown in FIG. 10 also includes a metal oxide varistor Mov connected across the input terminals of the AC power source, in order to protect the whole control circuit from transient voltage surges.

If the GFCI receptacle is inadvertently miswired by connecting the line to the load, before the reset switch RESET closes, the control circuit is de-energized. When the control circuit is not energized, the reset pull rod 61 cannot pass through the latch 75, thus the break switch cannot be closed. In other word, the trip coil cannot produce a corresponding electromagnetic force to act on the plunger 74, thereby keeping the GFCI also de-energized, achieving the reverse wiring protection function.

In summary, the present invention provides a GFCI receptacle that has reverse wiring protection function and the advantages of tripping rapidly, operating conveniently, and reasonable configuration.

While only the fundamental features of the present invention have been shown and described, it will be understood that various modifications and substitutions and changes of the form and details of the device described and illustrated and in its operation may be made by those skilled in the art, without departing from the spirit of the invention.

The invention claimed is:

1. A grounding fault circuit interrupter, including a housing, a trip means, and a control circuit, characterized in that it further comprises a pair of static contact pieces fixed on the housing;

a pair of load contact pieces fixed on the housing;

a pair of slide frames;

a pair of movable contact pieces fixed on the slide frames respectively, which are resiliently movable and each has one end connected to conductive pieces through conductive strips, the conductive pieces welded on the circuit board respectively and passing through a sensing transformer and a neutral transformer, said pair of slide frames resiliently and movably mounted on a coil bracket;

wherein when the static contact pieces are in contact with the movable contact pieces, the static contact pieces are electrically connected to the load contact pieces; and wherein when the static contact pieces are separated from the movable contact pieces, the static contact pieces are electrically disconnected from the load contact pieces.

2. The grounding fault circuit interrupter of claim 1, wherein the trip means comprises a trip coil, a plunger provided in the trip coil, a trip spring abutted against the plunger, a balance frame, a latch, a reset pull rod slidably provided in the balance frame, said plunger having an annular groove through which the plunger is able to slidably connect with the latch, said latch having an arc-shaped opening and slidably provided on the balance frame, said balance frame having two wedge sides, the wedge sides in contact with the slide frames; wherein when the reset pull rod is connected with the latch, the static contact pieces are in contact with the movable contact pieces; when the reset pull rod is separated from the latch, the static contact pieces are withdrawn contact with the movable contact pieces.

3. The grounding fault circuit interrupter of claim 2, wherein the reset pull rod has a lock groove, when the reset pull rod connects with the latch, the latch is lodged in the lock groove.

4. A grounding fault circuit interrupter, including a housing, a trip means, a pair of static contact pieces fixed on the housing, a pair of load contact pieces fixed on the housing, characterized in that the grounding fault circuit interrupter further comprises a pair of slide frames;

a pair of movable contact pieces fixed on the slide frames respectively, which is resiliently movable;

said trip means including a trip coil, a plunger provided in the trip coil, a trip spring abutted against the plunger, a balance frame, a latch, a reset pull rod, said plunger provided with an annular groove through which the plunger is movably connected to the latch, wherein the latch has an arc-shaped opening and is movably provided on the balance frame, said balance frame having two wedge sides, the wedge sides in contact with the slide frames; wherein when the reset pull rod is connected with the latch, the static contact pieces are in contact with the movable contact pieces; and wherein when the reset pull rod is separated from the latch, the static contact pieces are withdrawn contact with the movable contact pieces.

5. The grounding fault circuit interrupter of claim 4, wherein the reset pull rod has a lock groove, and when the reset pull rod connects with the latch, the latch is lodged in the lock groove.

6. The grounding fault circuit interrupter of claim 4, wherein respective one ends of each said movable contact pieces are connected with conductive strips, and the conductive strips are connected with conductive pieces, and the conductive pieces are welded on the circuit board respectively, and the pair of slide frames are resiliently movable respective to the housing, wherein when the static contact pieces are in contact with the movable contact pieces, the static contact pieces are electrically connected with the load contact pieces; and wherein when the static contact pieces are separated from the movable contact pieces, the static contact pieces are electrically disconnected from the load contact pieces.

* * * * *